(12) United States Patent
Spencer (10) Patent No.: US 6,311,247 B1
(45) Date of Patent: Oct. 30, 2001

(54) SYSTEM FOR BRIDGING A SYSTEM BUS WITH MULTIPLE PCI BUSES

(75) Inventor: Thomas V Spencer, Ft Collins, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/232,193

(22) Filed: Jan. 15, 1999

(51) Int. Cl.$^7$ ..................................................... G06F 13/00
(52) U.S. Cl. ............................................. 710/127; 710/129
(58) Field of Search ................................... 710/100, 101, 710/102, 103, 126, 127, 128, 129

(56) References Cited

U.S. PATENT DOCUMENTS

| 5,528,764 | 6/1996 | Heil . | |
|---|---|---|---|
| 5,632,021 | 5/1997 | Jennings et al. . | |
| 5,696,949 | 12/1997 | Young . | |
| 5,710,906 | 1/1998 | Ghosh et al. . | |
| 5,737,144 | 4/1998 | Callison et al. | 711/114 |
| 5,761,462 | 6/1998 | Neal et al. . | |
| 5,790,814 | 8/1998 | Gan et al. . | |
| 5,826,048 | 10/1998 | Dempsey et al. . | |
| 5,859,988 | * 1/1999 | Ajanovic et al. | 710/129 |
| 5,935,233 | * 8/1999 | Jeddeloh | 710/129 |
| 6,182,178 | * 1/2001 | Kelley et al. | 710/126 |

* cited by examiner

Primary Examiner—Glenn A. Auve (57) ABSTRACT

The present invention is directed to a system for interfacing a system bus to a plurality of Peripheral Component Interconnect (PCI) buses. Specifically, the invention is directed to a system that interfaces a system bus to a plurality of PCI buses, wherein each PCI bus is dedicated to a single PCI device, or slot. The configuration provided by the present invention realizes significant performance enhancements over prior art systems that have shared PCI buses (multiple PCI devices per PCI bus), by providing a direct pipe between the system bus to each PCI device. In accordance with the invention, the system comprises multiple integrated circuit components, including a first integrated circuit and a plurality of second integrated circuit components. The first integrated circuit includes a system bus interface configured to interface with the system bus and a plurality of output interfaces. Each output interface has a fewer number of signals than the system bus interface, and each is configured to generally operate at a communication frequency that matches the communication frequency of a corresponding PCI device/bus. Each of the second integrated circuits includes a PCI interface configured to interface with a PCI bus and at least one input interface configured to directly interface with an output interface of the first integrated circuit.

20 Claims, 5 Drawing Sheets

SYSTEM FOR BRIDGING A SYSTEM BUS WITH MULTIPLE PCI BUSES

BACKGROUND OF THE INVENTION

1. Field of the Invention

The present invention generally relates to computer systems, and more particularly to a system for bridging a system processor bus with multiple PCI buses, to provide improved performance and fault tolerance.

2. Discussion of the Related Art

In computer system design, a principal objective is to continually design faster and more efficient computer systems. One of the bottlenecks that has limited the performance of personal computers in the past has been the maximum specified speed of the ISA bus. In original IBM PC AT computers manufactured by IBM Corp., the I/O bus operated with a data rate of 8 MHz (BCLK=8 MHz). This was an appropriate data rate at that time since it was approximately equivalent to the highest data rates which the CPUs of that era could operate on the host bus. CPU data rates are many times faster today, however, so the slow speed of the I/O bus severely limits the throughput of systems today. One solution for this problem has been the development of local bus standards, by which certain devices which were traditionally located on the I/O bus can now be located on the host bus—e.g., the VESA VL-Bus Local Bus Standard.

Another solution to the problem has been the development of another standard, referred to herein as the PCI standard. The PCI bus achieves very high performance, in part because its basic data transfer mode is by burst. That is, data is always transferred to or from a PCI device in a known sequence of data units defined by a known sequence of data unit addresses in an address space. In a "cache line" burst mode, a predetermined number of transfers take place. In a "linear" burst mode, any number of transfers (including 1) can take place to/from linearly sequential addresses until either the initiator or the target terminates the transaction. In either mode, the initiator need only specify the starting address because both parties know the sequence of addresses which follow. The implementation of the PCI bus is well known in the industry and its specifications are available to the public.

Many computing systems, including many personal computers, have a single PCI bus that extends to various devices on a motherboard, as well as to several expansion slots on the motherboard. Expansion cards may be inserted into the expansion slots to provide expanded capabilities for the computers. In the context of the PCI bus, multiple PCI devices may share a single PCI bus and, in this regard, multiple PCI devices may be provided on separate expansion cards. More advanced systems may, however, provide multiple PCI buses.

Figure 1:
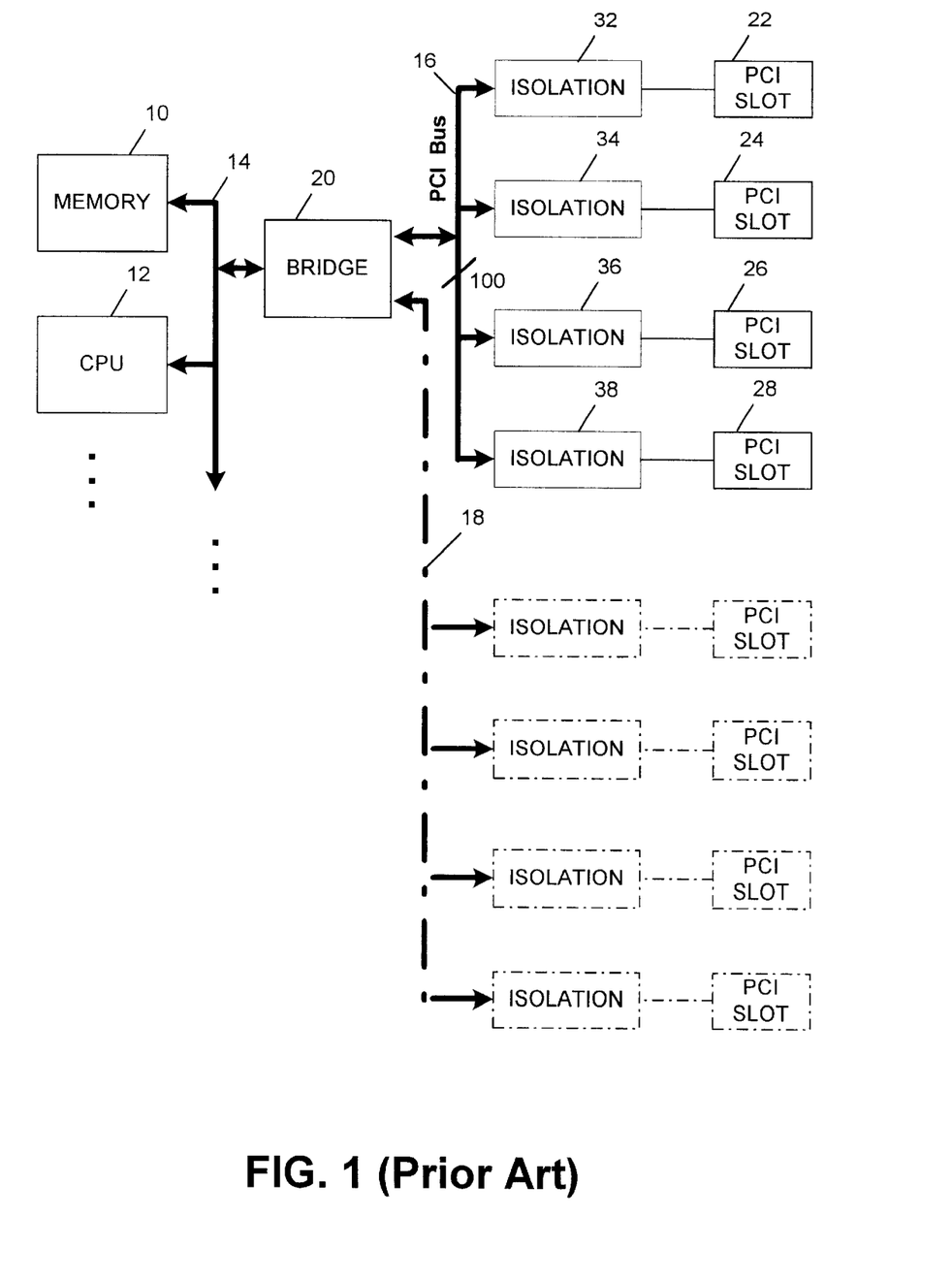
FIG. 1 is a block diagram of a conventional computing system and PCI bus configuration.

By way of illustration, reference is made to FIG. 1, which is a block diagram illustrating a multiple PCI bus configuration, as is known in the prior art. The figure illustrates a computing system having a memory 10, a CPU 12, and other devices (not shown) interconnected for communication along a system bus 14. At least one PCI bus 16, 18 is also provided as part of the computing system. A device known as a bridge 20 is provided as a buffer/translator between the PCI bus 16 and the system bus 14. More specifically, and as is known, the signaling and protocol on a PCI bus is different than that on a system bus 14. A bridge is a device that "bridges" the communications between a system bus 14 and a PCI bus 16. As previously mentioned, multiple PCI devices may be configured for communication along a single PCI bus. In this regard, FIG. 1 illustrates four slots 22, 24, 26, and 28 that are disposed for communication with the PCI bus 16. These slots may be expansion slots for receiving plug in cards that may communicate across the PCI bus 16.

As is further known, isolation circuitry 32, 34, 36, and 38 may be provided in higher-end systems to allow on-line replacement of PCI device cards. In this regard, the isolation circuitry 32 electrically isolates PCI slot 22 from PCI slots 24, 26, and 28, which share the same PCI bus. The isolation circuitry serves to protect PCI devices from an electrical short, signal spike, or other electrical irregularities that often occur coincident with on-line replacement of PCI card devices.

There is, however, a limitation on the number of PCI devices that may be interconnected along a single PCI bus 16. This limitation may differ from system to system, but generally results from electrical loading limitations and/or the recognition that an excessive number of PCI devices sharing a common bus will generally result in an over contention for the bus, thereby reducing system performance and efficiency. Accordingly, systems are known to provide multiple PCI buses. In this regard, a second PCI bus 18 is illustrated in FIG. 1. It is illustrated in dash line to represent the notion that it is an optional bus, which is not necessarily provided in all systems. A similar multiple slot/isolation circuitry configuration may be provided on the second bus as well. Both buses 16 and 18 interface to the system bus 14 by way of a common bridge 20.

Generally, however, no more than two PCI buses are provided in a system having a configuration similar to that of FIG. 1. The reason results simply from physical limitations of devices. Although the specific number may vary from system to system, a PCI bus typically comprises about one hundred conductors, in order to carry all the necessary data, address, and control signals. Therefore, a bridge circuit 20 supporting two PCI buses would require over two hundred signals to interface to external circuitry. These include the approximately two hundred conductors required to interface to the two PCI buses, as well as an additional plurality of pins required to interface to the system bus 14. Accommodating additional PCI buses is, therefore, limited by the physical limitation required in the number of conductors for interfacing to the PCI buses.

One problem with the systems of the type illustrated in FIG. 1 relates to the isolation between various PCI devices. While the isolation circuitry 32, 34, 36, and 38 electrically isolates one PCI device from another, it does not provide "logical" isolation between the various PCI devices. For example, suppose a PCI device residing in slot 22 requests data but, due to a failure on the device, never accepts the data from the PCI bus 16. This could, in many systems, hold up the PCI bus 16 preventing other PCI devices from communicating across the PCI bus, because the PCI bus is stalled waiting for the device in slot 22 to accept data. In this way, a failure of one PCI device may affect the system operation by starving other PCI devices that need to share the common PCI bus 16. In this regard, and as will be appreciated by those skilled in the art, I/O cards are generally characterized by a higher replacement frequency that other types of cards, thereby making on-line replacement (and the need for the isolation circuitry) relatively important, in high-end systems requiring a high level of availability.

Another shortcoming with systems of the type illustrated in FIG. 1 relates to PCI device inconsistencies. More specifically, PCI devices are known to operate in either a 32 bit or 64 bit mode. Also, some PCI devices now operate at 66 MHz while others operate at 33 MHz. In present systems, upon system reset (or power-up) the system will evaluate the various devices along a PCI bus to configure the system for operation therewith. If, for example, three PCI devices in slots 22, 24, and 26 operate at the faster 66 MHz operation, while a fourth PCI device in slot 28 operates at the slower 33 MHz operation, the system will configure all the PCI devices on bus 16 to operate at the slower 33 MHz speed, thereby negating the performance advantage that could otherwise be obtained from the faster PCI cards in slots 22, 24, and 26. As a practical matter, on a four slot bus like that shown in the drawings, it is unlikely that any of the cards could be configured to operate at 66 Mhz, due to electrical loading.

A similar inefficiency occurs when one or more of the PCI cards along a given PCI bus operates in a 32 bit (as opposed to 64 bit) mode. Although the various cards could operate, individually, at their data width capacity, operating 32 bit cards on a 64 bit bus results in wasted bandwidth, and thus less that optimal efficiency.

Accordingly, there is a desire to provided an improved system for interfacing (or bridging) a system bus to multiple bus that overcomes the above-identified and other shortcomings.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for interfacing a system bus to a plurality of Peripheral Component Interconnect (PCI) buses. Specifically, the invention is directed to a system that interfaces a system bus to a plurality of PCI buses, wherein each PCI bus is dedicated to a single PCI device, or slot. The configuration provided by the present invention realizes significant performance enhancements over prior art systems that have shared PCI buses (multiple PCI devices per PCI bus), by providing a direct pipe between the system bus to each PCI device.

In accordance with the invention, the system comprises multiple integrated circuit components, including a first integrated circuit and a plurality of second integrated circuit components. The first integrated circuit includes a system bus interface configured to interface with the system bus and a plurality of output interfaces. Each output interface has a fewer number of signals than the system bus interface, and each is configured to generally operate at a communication frequency that matches the communication frequency of a corresponding PCI device/bus. Each of the second integrated circuits includes a PCI interface configured to interface with a PCI bus and at least one input interface configured to directly interface with an output interface of the first integrated circuit.

As should be appreciated, by implementing the invention through multiple integrated circuit components that intercommunicate over high-speed interfaces, each having a relatively few number of bits, the first integrated circuit may be provided to support multiple output interfaces that can each be interfaced to a separate PCI bus through the second integrated circuit. It will be appreciated that the communication frequency of the high-speed interfaces will generally be faster than the communication frequency of the associated PCI bus, as the same volume of information will be communicated across these interfaces, using a fewer number of bits. Therefore, multiple data exchanges will take place across these interfaces for each exchanged that takes place across the PCI bus interface. The relatively few number of bits comprising these interfaces, however, allows more PCI busses to be supported, before reaching the pin/lead boundary limitation that is generally imposed by the physical size limitation of an integrated circuit device.

In accordance with a preferred embodiment of the invention, each first integrated circuit includes a buffer memory interposed between the system bus interface and the plurality of output interfaces. The buffer memory is configured to buffer exchanges of data between the system bus interface and the plurality of output interfaces. Preferably, the buffer memory includes both an outbound FIFO and an inbound FIFO configured to buffer exchanges of data.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
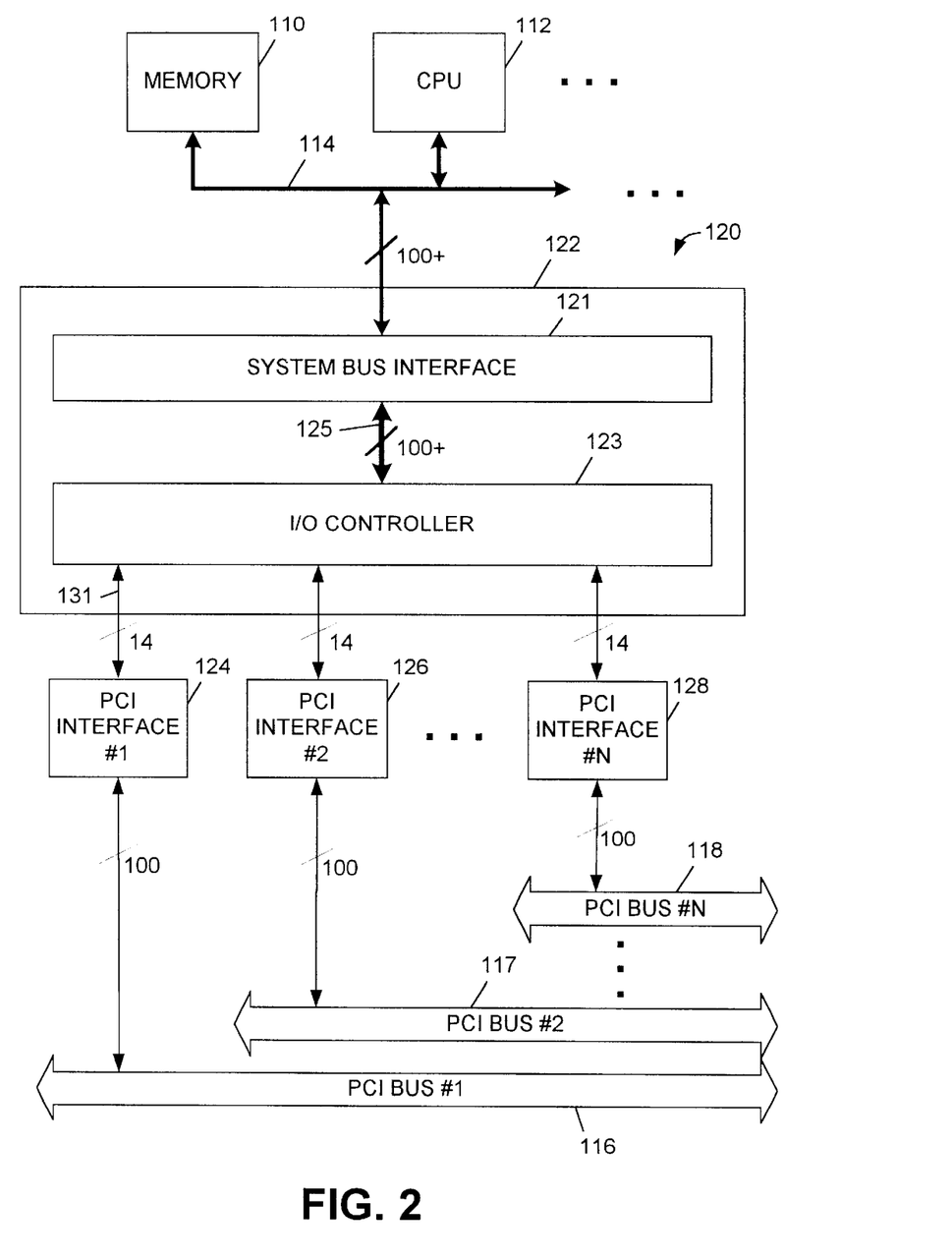
FIG. 2 is a block diagram of a computing system and multiple PCI bus configuration constructed in accordance with the invention.

Turning now to the drawings, reference is made to FIG. 2, which is a block diagram illustrating a system constructed in accordance with the present invention. Like the system illustrated in FIG. 1, the present invention is generally directed to a device for use in a system having a memory 110, a CPU 112, and other devices (not shown) interconnected for communication along a system bus 114. The present invention is more particularly directed to a bridge or device 120 that facilitates the intercommunication between a system bus 114 and a plurality of PCI buses 116, 117, and 118. Advantageously, the device of the present invention provides logical and electrical isolation between each of the PCI buses 116, 117, and 118, and accommodates more PCI buses than typical prior art configurations. To achieve this aspect, and overcome the physical limitations recognized in prior art systems, the device 120 of the present invention is provided in multiple physical components. These components include a first integrated circuit 122 and a plurality of second integrated circuits 124, 126, and 128. Broadly, the first integrated circuit includes a system bus interface 121 and an I/O controller 123. As the name implies, the system bus interface 121 includes circuitry that provides an interface to the system bus 114. The system bus interface provides an intermediate bus 125 for communication with the I/O controller 123. Although the specific number of conductors will vary from system to system, it is generally anticipated that both the system bus 114 and the intermediate bus 125 will comprise over one hundred conductors.

The I/O controller 123, which will be described in more detail in connection with FIG. 4, generally operates to parse and reformat the signals carried on bus 125 into much smaller units that may be communicated over a high-speed bus comprising much fewer conductors. The second integrated circuits 124, 126, and 128, which will be described in more detail in connection with FIG. 5, generally operate to interface with the high-speed bus 131, so as to collect and reformat data that may then be interfaced to a PCI bus (e.g., 116). By designing a bridge circuit to comprise multiple physical devices that intercommunicate along high-speed, small width buses the device of the first integrated circuit 122 may accommodate many more interfaces (and therefore PCI buses) before reaching the physical boundary limitation of excessive number of pins or electrical conductors as encountered in prior art systems.

As will be described in more detail below, the device 120 of the preferred embodiment actually provides multiple buses per PCI interface device 124, 126, 128. That is, the I/O controller 123 communicates with a first PCI interface device 124 by way of a fourteen conductor bus 131. In the preferred embodiment, this bus includes a data path of ten bits or conductors, with four additional conductors used for control. Although not specifically shown, this bus also includes four conductors that are used to provide two differential clock signals (one in each direction). As will be described in more detail in connection with FIGS. 4 and 5, the robust system of the present invention is configurable, such that multiple PCI interfaces 124, 126 may be grouped in pairs or quads, in such a way as to provide much greater throughput. Grouping the interfaces in this way, however, limits the number of PCI buses that may be supported. What is significant, for purposes of the present invention, is that in a given computer system, a much greater isolation between PCI devices may be provided. In this regard, and as previously mentioned, computing systems of the prior art were generally limited in the number of PCI buses that were supported. Accordingly, if more PCI devices were utilized in a system than the number of the PCI buses for that system, then multiple PCI devices had to be grouped and shared on a single PCI bus, and logical isolation between the devices could not be achieved. The system of the present invention provides for greater logical isolation, by accommodating more separate PCI buses.

Another advantage of the isolation provided by the system of the present invention relates to improved system performance. In one regard, system performance is improved where PCI device inconsistencies occur. For instance, if a system constructed in accordance with the present invention is configured with four different PCI devices, where three of the devices operate in a 64 bit, 66 MHz mode, while the fourth PCI device operates in a 32 bit, 33 MHz mode, if the PCI devices are provided on separate PCI buses, then only one PCI bus will operate at the slower speed, while the remaining buses will operate at the higher speeds, and thereby provide an overall improved system performance. More significantly, however, the system of the present invention realizes a significant performance increase by virtue of the single bus connection between the each PCI slot and the system bus 114. By providing each PCI device with its own bus, then each has a direct pipe/path to the system bus 114, which realizes much greater throughput. In addition, the failure of one PCI device, will not affect the operation of any of the other PCI devices (e.g., failure of one device will not starve other devices).

Figure 3:
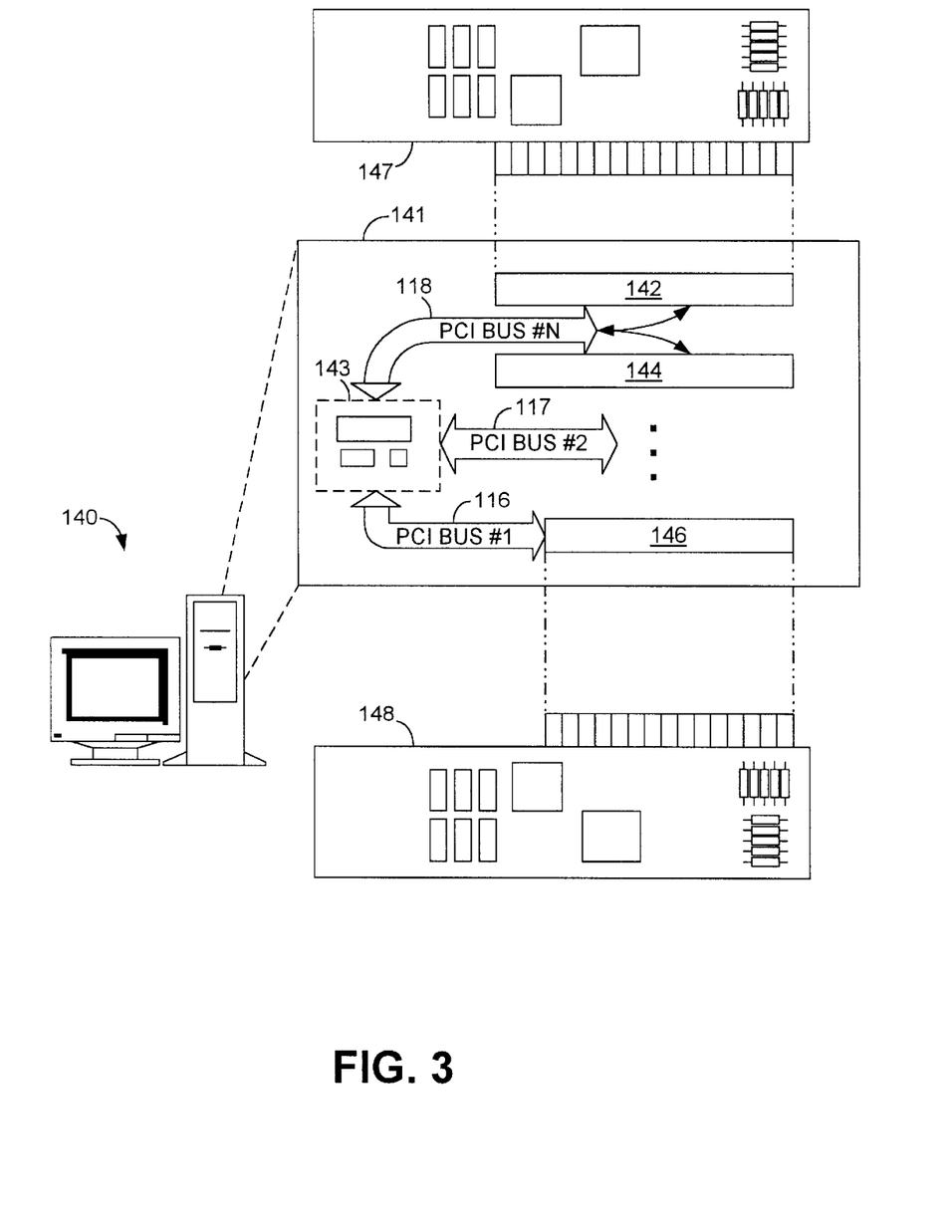
FIG. 3 is a block diagram illustrating certain environmental physical components of a system constructed in accordance with the invention.

Reference is now made to FIG. 3, which illustrates physical components of a system constructed in accordance with the present invention. As will be appreciated, the device of the present invention comprises circuitry for a computer system, and may be deployed in a wide variety of computing systems, including desktop computing systems as well as very advanced, high performance computing systems. For purposes of illustration, a computer 140 is illustrated as personal computing type computer system. Within the computer 140, a motherboard 141 may be provided having circuitry 143 that may include a CPU, memory, etc. As is now conventional in computing systems, various expansion slots 142, 144, and 146 may be provided and disposed to receive plug in, expansion cards 147 and 148. These cards may include I/O controllers, such as disk drive controllers, video cards, modems or other communication devices, etc., that ultimately communicate with circuitry 143 of the computing system by way of PCI buses.

In a system constructed in accordance with the invention, a plurality of PCI buses 116, 117, and 118 are provided. These buses 116, 117, and 118 may be configured to interface each to a single expansion slot, such as PCI bus 116 and expansion slot 146. Alternatively, and depending upon the number of PCI buses and expansion slots provided, one or more of the PCI buses may be configured to interface to multiple expansion slots. In the illustrated embodiment, PCI bus 118 is configured to interface with two expansion slots 142 and 144. In this regard, the circuitry of the present invention is compatible with conventional PCI buses, whereby multiple PCI devices may be shared along a common bus, and therefore operate in a conventional manner. Such shared PCI devices will, however, be subject to the same "logical separation" shortcomings of systems in the prior art, and will suffer some of the same performance inefficiencies. Therefore, it will be desirable to configure the systems, whenever possible, to provide a one to one correspondence between PCI devices and PCI buses.

Figure 4:
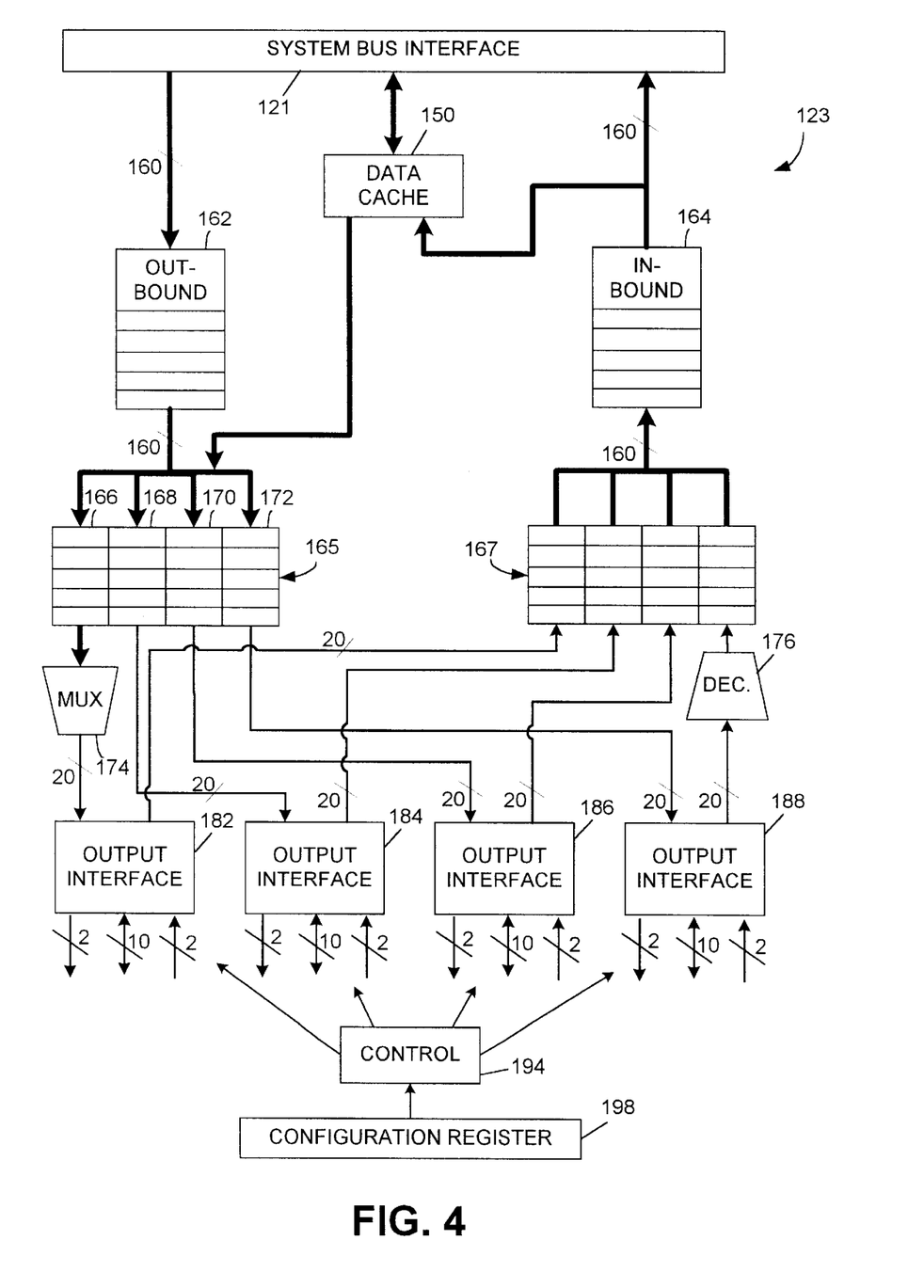
FIG. 4 is a block diagram of an I/O controller of the present invention.

Having, described the physical layout, and a basic top-level architecture of a device 122 constructed in accordance with the present invention, reference is now made to FIG. 4 which illustrates the principal functional components of the first integrated circuit 122. It will be appreciated that the specific implementation of the various circuitry illustrated by the top-level block diagram of FIG. 4 may be implemented in a wide variety of ways, and the specific implementation will necessarily vary from system to system. For purposes of the present invention, however, such a detailed presentation and description is not necessary, as the teachings provided herein are sufficient to enable one of ordinary skill in the art to implement the specific circuitry necessary to achieve the concepts and teachings claimed herein.

As previously mentioned in connection with FIG. 2, the first integrated circuit 122 includes a system bus interface 121 that includes circuitry configured to interface with the system bus 114 of the computer system hosting the present invention. This bus, and therefore the circuitry of the system bus interface 121, will necessarily vary from system to system as, for example, the timing and signals of system buses differ. The I/O controller 123 interfaces with the system bus interface 121 primarily through the exchange of control/command information and data. That is, information exchanged between a system bus and a PCI bus is generally in the form of either commands, instructions, or data. Data is communicated between the two buses by way of a data cache 150. Although not shown, a companion block denoted as "Cache Tags" is also provided and, in essence, stores the address information of data within the data cache 150.

As illustrated, the controller 123 includes paths for inbound and outbound communications. In this regard, an outbound FIFO 162 provides a mechanism through which most outbound (i.e., from the system bus to the PCI bus) communications are directed. Similarly, an inbound FIFO 164 provides a medium through which most inbound (i.e., from the PCI bus to the system bus) communications are directed. For implementation and efficiency reasons, the details of which need not be described herein, a data cache 150 is also provided, which, in the outbound direction, bypasses the outbound FIFO 162. Data that is retrieved in response to a DMA read is directed through the data cache 150.

In the preferred implementation, a FIFO grouping 165 is disposed immediately downstream of the outbound FIFO 162. Specifically, the FIFO grouping 165 includes four FIFOs 166, 168, 170, and 172 disposed in parallel. As illustrated, the output of each FIFO is directed to one of the output interfaces 182, 184, 186, and 188. As further illustrated, the data path entering each FIFO 166, 168, 170, and 172 is approximately one hundred sixty bits wide. The data path output from the each FIFO 166, 168, 170, and 172 is approximately 20 bits wide. To achieve this signal path downsizing, a multiplexer may be associated with the output of each FIFO 166, 168, 170, and 172. For simplicity, only one such multiplexer 174 has been illustrated in FIG. 4. As will be appreciated by persons skilled in the art, the one hundred sixty signal lines may be fed into the multiplexer 174, which can select twenty signal lines at a time to feed to the output. Thus, for example, the one hundred sixty signal lines may be directed from the output of FIFO 166 to one of the output interfaces 182, 184, 186, and 188, over a period of eight clock cycles, twenty bits at a time. Again, similar multiplexers (not shown) are associated with the outputs of the remaining FIFOs 168, 170, and 172.

A similar configuration, but disposed in the opposite direction, is provided for inbound data. Thus, four companion FIFOs 167 are disposed upstream of the inbound FIFO 164. Instead of multiplexers, however, decoder circuits 176 may be used to upsize the data path from approximately twenty bits to one hundred sixty bits.

Finally, FIG. 4 illustrates output interfaces 182, 184, 186, and 188. Each output interface is configured for direct connection and communication with an input interface 202, illustrated in FIG. 5. In accordance with a preferred embodiment of the present invention, the system is designed for robust operation, wherein each of the output interfaces may be configured for independent operation. In addition, the output interfaces may be configured to operate as companions, either in pairs or in quads. For example, output interfaces 182 and 184 may be configured to operate as companions, so that data is essentially communicated twenty bits at a time, instead of ten bits at a time, across the direct connection between may between the output interfaces 182 and 184 and the corresponding input interfaces. When configured to operate in companion mode, the four control bits of the first output interface may be used for the second output interface as well. In similar fashion, the output interfaces 182, 184, 186, and 188 may be configured to operate collectively, to communicate forty bits of information at a time.

To this end, control circuitry 194 and a configuration register 198 are illustrated. The control circuitry blocks 194 simply illustrate the notion that circuitry is provided to control the operation of the output interfaces 182, 184, 186, and 188. A configuration register 198 may be provided to contain the information that determines whether the output interfaces will be configured to operate singularly or in companion mode with other output interface(s). In this regard, the configuration register may be addressed by the CPU and written to (e.g., software control) to configure the hardware interface of output interfaces.

Again, it will be appreciated that additional circuitry will necessarily be provided in connection with the I/O controller, but such additional circuitry may be designed to take on a wide variety of forms, and is well within the knowledge scope of a person having ordinary skill in the art. Therefore, a more specific or detailed description of this circuitry need not be provided herein.

Figure 5:
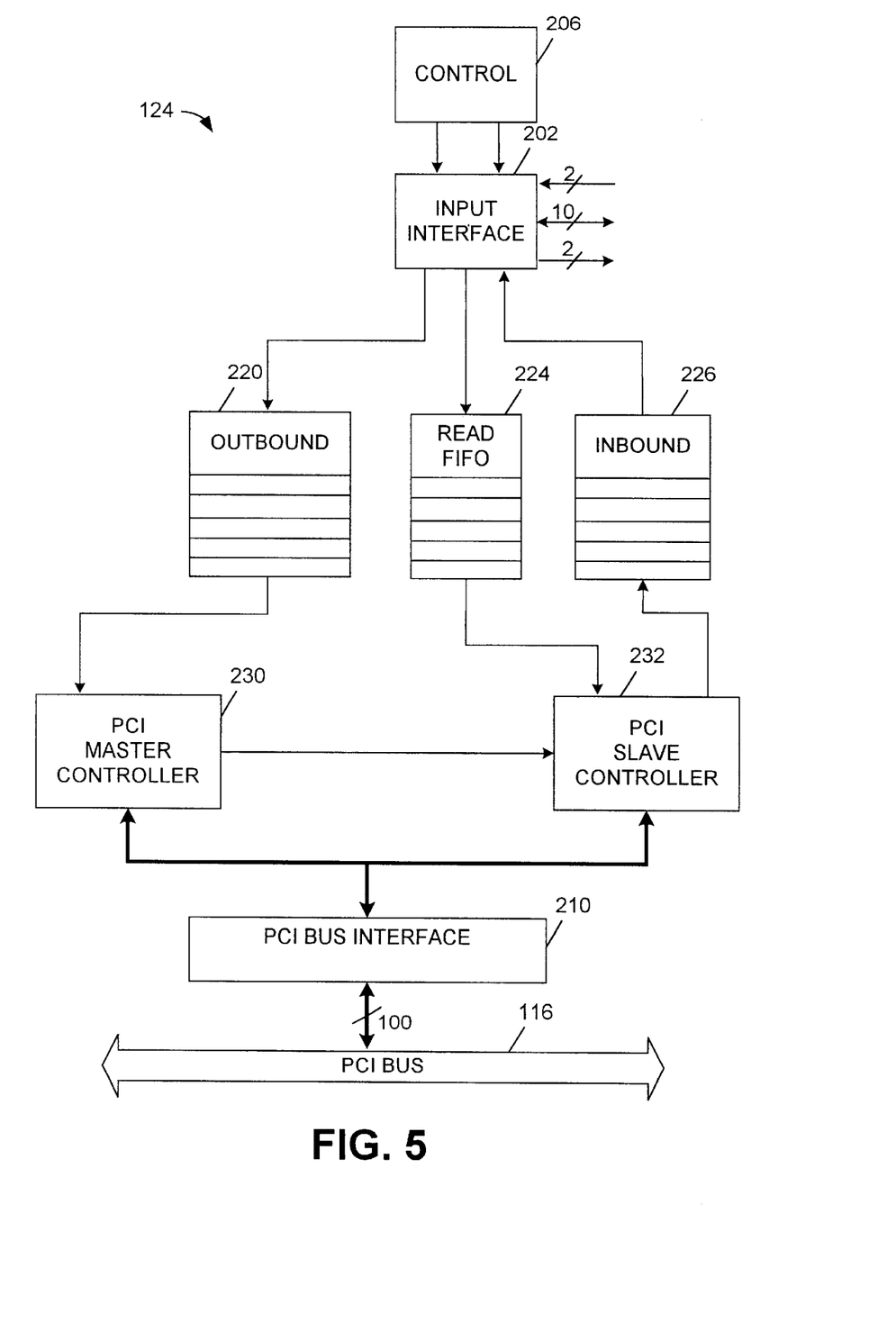
FIG. 5 is a block diagram of a PCI bus interface, constructed in accordance with the invention.

Reference is now made to FIG. 5, which illustrates a single PCI interface (e.g., PCI interface 124 of FIG. 2). The PCI interface includes an input interface 202 that is configured for direct connection to an output interface 182 illustrated in FIG. 4. Accordingly, input interface 202 includes ten signal lines for conveying control and data information, and four lines for carrying timing or signaling information (clock lines are not illustrated). A control circuit 206 is also provided in conjunction with the input interface 202 and includes circuitry for controlling and configuring the input interface 202.

The PCI interface also includes a PCI bus interface 210 that includes circuitry for interfacing to the PCI bus 116. Information is exchanged between the input interface 202 and the PCI bus interface 210 by way of FIFOs 220, 224, and 226. These FIFOs operate in much the same manner as the FIFOs described in connection with FIG. 4, in that data written or received in a burst fashion may be buffered by these FIFOs, so that data exchanges between the PCI bus 116 and the PCI bus interface 210 may occur at different data rates than exchanges between the interface 202 with the output interfaces 182, 184, 186, and 188 of FIG. 4. In addition, a PCI master controller circuit 230 and a PCI slave controller circuit 232 are provided. As previously mentioned, the device 120 of the present invention allows PCI devices to be cascaded on a common PCI bus 116. In connection with communications on a common bus, one PCI device will be denoted as the master and one PCI device will be denoted as the slave (or target) device. The PCI master controller 230 and PCI slave controller 232 are essentially state machines that control communications in accordance with a master/slave format. Thus, the PCI master controller 230 is used to control master transactions on the PCI bus 116. These transactions are usually the result of a processor programmed I/O transaction, but could also be peer to peer transactions initiated from another PCI bus. The PCI master controller 230 is configured to unload data and addresses from the outbound FIFO 220.

The PCI slave controller 232 responds to most transactions mastered on the PCI bus 116 by other PCI devices. The PCI slave controller decodes the address to determine what type of access is being attempted. If the transaction is a peer to peer on the same PCI bus, then the PCI slave controller need not participate. Otherwise, it services the request. If the PCI transaction is directed to a memory address of the system memory, then the data is ultimately read from or written to the system memory by way of the read FIFO 224 or inbound FIFO 226 of the PCI interface, and the inbound FIFO 164 of the I/O controller and through the data cache space 150 (see FIG. 4). Of course, the detailed implementation of the present invention will preferably account for various types of data transactions. For example, memory reads and writes, register reads and writes, I/O port reads and writes, peer to peer transactions, etc. For purposes of the present invention, however, a detailed description of the specific methods and circuitry implemented to handle these various transactions is not needed, and is therefore not provided herein.

Although not specifically illustrate in FIG. 5, additional input interfaces may be provided in connection with the integrated circuitry of the preferred embodiment. These additional input interfaces may be utilized when multiple output interfaces (FIG. 4) are configured to operate in companion mode.

As will be appreciated by persons skilled in the art, the system of the present invention provides significantly better performance and improved fault tolerance over systems of the prior art.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for interfacing a system bus to a plurality of Peripheral Component Interconnect (PCI) buses comprising:
a first integrated circuit having a system bus interface configured to interface with the system bus and a plurality of output interfaces, wherein each output interface is configured to interface with a PCI interface, wherein each output Interface has a fewer number of signals than the system bus interface, and each output interface is configured to substantially match the communication frequency of an associated PCI bus;
a plurality of second integrated circuits, each having a PCI interface configured to interface with a PCI bus and an input interface configured to directly interface with an output interface of the first integrated circuit.

2. The system as defined in claim 1, wherein the first integrated circuit further includes a configuration circuit for selectively configuring pairs of the output interfaces as companions, to operate collectively.

3. The system as defined in claim 2, wherein the configuration circuit includes at least one configuration register.

4. The system as defined in claim 1, wherein the first integrated circuit further includes a configuration circuit for selectively configuring four output interfaces as companions, to operate collectively.

5. The system as defined in claim 1, wherein the first integrated circuit includes a buffer memory interposed between the system bus interface and the plurality of output interfaces, the buffer memory being configured to buffer exchanges of data between the system bus interface and the plurality of output interfaces.

6. The system as defined in claim 5, wherein the buffer memory includes an outbound FIFO configured to buffer data exchanged from the system bus to the plurality of output interfaces.

7. The system as defined in claim 5, wherein the buffer memory includes an inbound FIFO configured to buffer data exchanged from the plurality of output interfaces to the system bus.

8. The system as defined in claim 5, wherein the buffer memory includes an inbound FIFO configured to buffer data exchanged from the plurality of output interfaces to the system bus, and an outbound FIFO configured to buffer data exchanged from the system bus to the plurality of output interfaces.

9. The system as defined in claim 8, wherein the first integrated circuit includes a data cache interposed between the system bus interface and the plurality of output interfaces, and configured to store address and control information for programmed I/O read and write operations.

10. The system as defined in claim 5, wherein the first integrated circuit includes a plurality of companion FIFOs. interposed between an outbound FIFO and the output interfaces, wherein an input of each of the companion FIFOs is in communication with an output of the outbound FIFO, and an output of each of the companion FIFOs is in communication with each of the output interfaces.

11. The system as defined in claim 10, further including a multiplexing circuit associated with the output of each of the companion FIFOs, each multiplexing circuit configured to effectively translate a relatively large number of signals output from each companion FIFO to a relatively small number of signals to be delivered to each output interface.

12. The system as defined in claim 5, wherein the first integrated circuit includes a plurality of companion FIFOs, interposed between an inbound FIFO and the output interfaces, wherein an input of each of the companion FIFOs is in communication with an output of the each of the output interfaces, and an output of each of the companion FIFOs is in communication with an input of the inbound FIFO.

13. The system as defined in claim 12, further including a decoding circuit associated with the input of each of the companion FIFOs, each decoding circuit configured to effectively translate a relatively small number of signals output from the output interfaces to a relatively large number of signals input to the input of each companion FIFO.

14. The system as defined in claim 1, wherein each of the second integrated circuits includes a buffer memory interposed between each of the at least one input interfaces and the PCI interface.

15. The system as defined in claim 14, wherein the buffer memory includes an outbound FIFO configured to buffer data exchanged from the at least one input interface to the PCI interface.

16. The system as defined in claim 14, wherein the buffer memory includes an inbound FIFO configured to buffer data exchanged from the PCI interface to the at least one input interface.

17. An integrated circuit for communication with a plurality of PCI buses, comprising: a system bus interface configured to interface with a system bus and a plurality of output interfaces, wherein each output interface has a fewer number of bit positions than the system bus interface, and each output interface operates at a communication frequency that substantially matches a communication frequency of a target PCI bus, wherein the system bus interface includes a buffer memory for facilitating the communication of data between the system bus and the plurality of output interfaces.

18. The integrated circuit as defined in claim 17, wherein the buffer memory includes an outbound FIFO configured to buffer data exchanged from the system bus to the plurality of output interfaces.

19. The integrated circuit as defined in claim 17, wherein the buffer memory includes an inbound FIFO configured to buffer data exchanged from the plurality of output interfaces to the system bus.

20. The integrated circuit as defined in claim 17, wherein the buffer memory includes an inbound FIFO configured to buffer data exchanged from the plurality of output interfaces to the system bus, and an outbound FIFO configured to buffer data exchanged from the system bus to the plurality of output interfaces.

* * * * *